United States Patent
Nunnink

(10) Patent No.: US 8,487,228 B2
(45) Date of Patent: Jul. 16, 2013

(54) SYSTEM FOR ADJUSTING FOCUS OF A LIQUID LENS IN A MACHINE VISION SYSTEM

(75) Inventor: Laurens Nunnink, Simpelveld (NL)

(73) Assignee: Cognex Corporation, Natick, MA (US)

( * ) Notice: Subject to any disclaimer, the term of this patent is extended or adjusted under 35 U.S.C. 154(b) by 706 days.

(21) Appl. No.: 12/415,197

(22) Filed: Mar. 31, 2009

(65) Prior Publication Data

US 2010/0243862 A1    Sep. 30, 2010

(51) Int. Cl.
*G02B 27/64* (2006.01)
*H01J 3/14* (2006.01)

(52) U.S. Cl.
USPC .................. 250/201.2; 250/216

(58) Field of Classification Search
USPC ............ 250/208.1, 201.1, 201.2, 201.4, 201.6–201.8, 221, 216, 559.1; 235/454, 462.23, 235/462.24, 462.42; 396/73, 79–83, 85–88; 348/345, 349, 350, 351, 357; 359/383, 665, 359/666, 298, 315, 299, 667, 676; 349/88, 349/199, 200, 57, 72
See application file for complete search history.

(56) References Cited

U.S. PATENT DOCUMENTS

| | | | |
|---|---|---|---|
| 5,493,452 A | | 2/1996 | Hoshino et al. |
| 5,600,121 A | * | 2/1997 | Kahn et al. ............... 235/462.48 |
| 5,751,501 A | | 5/1998 | Li |
| 6,760,154 B1 | * | 7/2004 | Focht .......................... 359/383 |
| 7,245,440 B2 | | 7/2007 | Peseux |
| 7,296,749 B2 | | 11/2007 | Massieu |
| 7,312,929 B2 | | 12/2007 | Choi et al. |
| 7,443,597 B2 | | 10/2008 | Humpston |
| 2002/0030749 A1 | * | 3/2002 | Nakamura et al. ........... 348/220 |
| 2005/0041301 A1 | * | 2/2005 | Kibayashi ..................... 359/666 |
| 2005/0113912 A1 | * | 5/2005 | Feenstra et al. .............. 623/6.13 |
| 2007/0035712 A1 | * | 2/2007 | Gassner et al. ................. 355/55 |
| 2007/0131770 A1 | * | 6/2007 | Nunnink ....................... 235/454 |
| 2008/0277477 A1 | | 11/2008 | Thuries et al. |
| 2008/0277480 A1 | | 11/2008 | Thuries et al. |
| 2008/0296385 A1 | * | 12/2008 | Vinogradov ............. 235/462.22 |
| 2010/0108765 A1 | * | 5/2010 | Vinogradov ............. 235/462.22 |

* cited by examiner

*Primary Examiner* — Que T Le
*Assistant Examiner* — Jennifer Bennett
(74) *Attorney, Agent, or Firm* — Quarles & Brady LLP

(57) ABSTRACT

A method and apparatus for recalibrating a liquid lens. In one embodiment, a lens holder is provided to adjust the focal length of the lens as a function of temperature. In another embodiment, a recalibration circuit including a second lens of similar characteristics to the imaging lens is used to determine an appropriate focus. In other embodiments, an open loop calibration process is used.

20 Claims, 6 Drawing Sheets

SYSTEM FOR ADJUSTING FOCUS OF A LIQUID LENS IN A MACHINE VISION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to machine vision systems and more specifically to systems for adjusting the focus of a liquid or micro-fluidic lens used in a machine vision system.

Machine vision systems have been developed for many different applications. For example, vision systems have been developed for reading bar codes and other types of symbols placed on packages or products to obtain information therefrom. Other vision systems have been developed for inspecting manufactured parts for features/characteristics.

Many vision systems include a camera for obtaining images of symbols or items to be imaged. A processor receives the images and extracts information which can then be used to perform one or more vision processes. In many applications the distance between a camera sensor and a symbol or item to be imaged may vary between uses. In these cases, in order to obtain useful images (i.e., images from which data required to complete machine vision processes can be extracted), an adjustable lens and auto-focus system is often provided. In these cases, when the system is activated to perform a vision process, the lens and auto-focus system automatically focus the lens so that a clear image of the symbol or item to be imaged is generated on the camera sensor. After the focusing process is completed, a clear image of the symbol or item to be imaged is obtained and is processed to complete the vision process.

One type of lens that can be used in a machine vision system is a liquid lens. Liquid lenses are constructed of one or more fluid of different refractive indexes, and can be varied by controlling the meniscus, or surface of the liquid. In one type of liquid lens, for example, two fluids are contained in a tube with transparent end caps. The first is an electrically conducting aqueous solution, and the second is a non-conducting oil. The interior of the tube is coated with a hydrophobic material, which causes the aqueous solution to form a hemispherical lens which can be adjusted by applying a DC voltage across the coating to decrease its water repellency in a process called electrowetting. Electrowetting adjusts the surface tension of the liquid changing the radius of curvature and adjusting the focal length of the lens.

Liquid lenses are extremely versatile, providing a highly variable focal length, without the need for moving parts. Liquid lenses, however, are subject to changes in focal length due to temperature changes and aging of the liquids in the lens. Temperature and aging can, for example, alter the refractive index of the liquids, or the dielectric constant.

Furthermore, when using a liquid lens in high speed applications, there may be insufficient time to capture a sufficient number of images of an object to optimize the focus for auto-focusing. For these applications, other methods must be used. The present disclosure addresses solutions to these issues.

BRIEF SUMMARY OF THE INVENTION

The present invention provides a method and apparatus for re-calibrating a liquid lens due to the effects of temperature and aging.

In one aspect, the present invention provides a system for performing a vision process using a camera. The system includes a liquid lens, an imaging sensor, and a mounting device for mounting the liquid lens a distance from the imaging sensor. The mounting device is adapted to adjust a distance between the lens and the imaging sensor to adjust the focus of the lens.

In another aspect of the invention, at least a portion of the mounting device comprises a material that is selected to have a thermal expansion coefficient that varies the length of the mounting device an amount selected to correspond to a focal length adjustment required for the lens at a selected range of temperatures.

In yet another aspect of the invention, a system for performing a vision process using a camera is provided. The system comprises an imaging liquid lens having an imaging lens field of view where the focus of the imaging liquid lens is adjustable. A calibration liquid lens having a calibration lens field of view that is focused on a target is also provided, along with an imaging sensor for imaging the calibration lens field of view, and a calibration processor that receives imaging data from the imaging sensor, that is configured to adjust a focus of the imaging liquid lens and the calibration liquid lens. The calibration processor being programmed to receive imaging data from the calibration imaging sensor, evaluate and readjust the focus of the calibration liquid lens on the target until the target is in focus, and provide a signal to adjust the focus of the imaging liquid lens to focus the imaging liquid lens.

In yet another aspect of the invention, the calibration processor provides the signal to adjust the focus of the imaging lens directly to the imaging lens. The calibration processor can also provide the signal to adjust the focus of the imaging lens to a processor for processing image data from the imaging field of view.

In still another aspect of the invention, a system for performing a vision process using a camera is provided. The system includes a liquid lens having an imaging lens field of view where the focus of the liquid lens is adjustable, an imaging sensor for imaging the field of view, and a target positioned at a predetermined location within the field of view. A processor receives imaging data from the imaging sensor, and is programmed to receive imaging data from the imaging sensor at the predetermined location in the field of view, evaluate, and readjust the focus of the liquid lens on the target until the target is in focus.

In another aspect of the invention, the imaging sensor and the processor are located in a housing, and the predetermined position of the target is within the housing. The target can, for example, be provided on a window located at a distal end of the housing.

In yet another aspect of the invention, the system can also include at least one aiming illuminator for providing feedback to an operator as to the position of the field of view. Here, the processor is further programmed to determine a distance to an external target based on feedback from the aiming illuminator, and to evaluate a focus of the liquid lens based on the focus of the external target. In some embodiments, a second aiming illuminator can be provided, and the processor can be programmed to calculate a distance between the aiming illuminator and the second aiming illuminator, focus the lens to obtain a sharp image of the calibration target, determine a size of the calibration target, and calculate a ratio of the distance to the size of the calibration target. The processor uses the ratio to determine a distance to the calibration target, which can then be used to calibrate the lens.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 1:
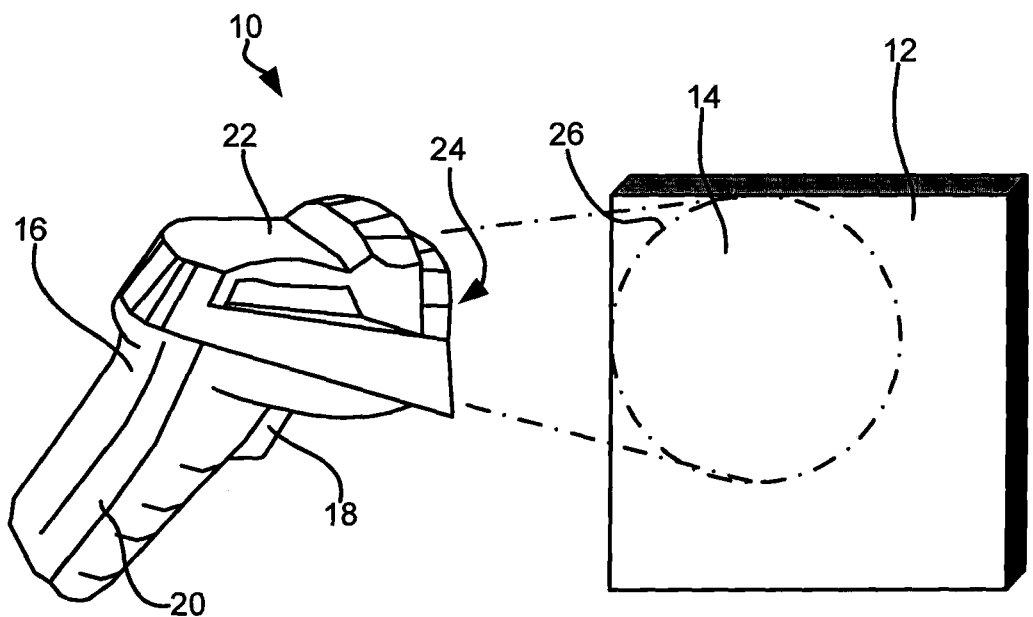
FIG. 1 is a perspective view of a hand-held reader device obtaining an image of a symbol on an item of interest that is consistent with at least some aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond with similar elements throughout the several views and, more specifically, referring to FIGS. 1 and 2, the present invention will be described in the context of an exemplary hand-held symbol reader 10 that can be used to obtain images of symbols (e.g., 14) placed on surfaces of items (e.g., 12) and that can decode the symbols in the obtained images. While the inventions herein are described in the context of hand-held device 10, it should be appreciated that the inventions may also be useful in other devices and systems including swipe reader type devices used in grocery and retail stores where customers or check-out attendants, as the label implies, swipe surfaces of items that include symbols across an area adjacent an imaging window to obtain images of the symbols thereon or systems that include stationary camera where a conveyor moves items or packages of various sizes through the field of view of the stationary camera such that the distance between the camera lens/sensor and the surface of a package or item on which the symbol is applied may vary item to item.

Figure 2:
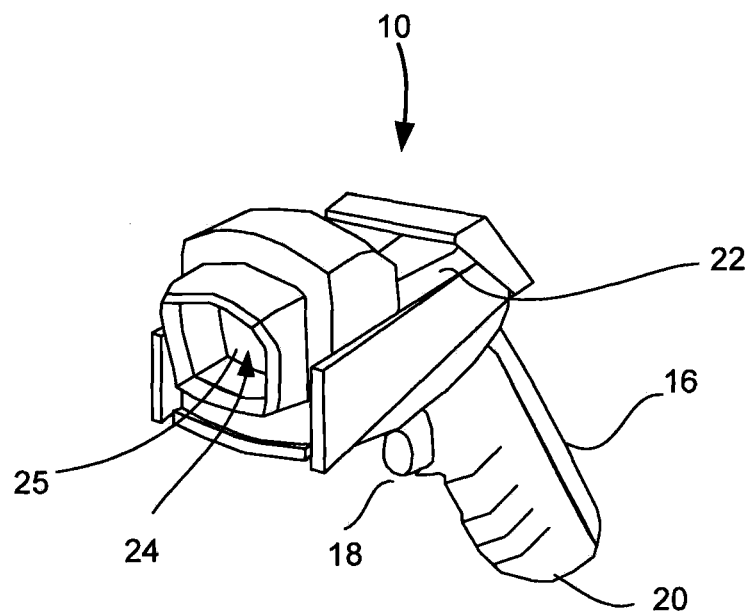
FIG. 2 is a second perspective view of a hand-held reader device obtaining an image of a symbol on an item of interest that is consistent with at least some aspects of the present invention, illustrating a front end of the hand-held reader device.

Referring still to FIGS. 1 and 2, hand-held reader 10 includes a rigid plastic housing 16 that forms a handle section 20 and a barrel section 22 that extends from the handle section 20 in an ergonomic fashion. A trigger 18 is provided at the top end of the handle section 20 just below barrel 22. An adjustable focal length lens 24 is provided at the distal end of the barrel section 22, optionally behind a window 25, and has a field of view 26. Lens 24 is a multi-focal liquid lens of the type described in U.S. Pat. No. 7,264,162, and which are commercially available from Varioptic SA of Lyon France. In these types of lenses, the focal length is adjusted by varying a voltage applied to the lens, as described above.

In typical operation, a user positions reader 10 such that the camera or lens field of view 26 is directed toward a surface of an item 12 on which a symbol 14 has been applied where the symbol 14 is disposed within the reader's field of view 26. Once so positioned, the user presses activation trigger or actuator 18 causing reader 10 to obtain images of the symbol 14 within the field of view 26. Once a suitably focused image or symbol 14 has been obtained, a processor within reader 10 decodes the symbol and then provides the decoded information to other software applications for use. In addition, after successful decoding of the symbol 14, reader 10 may provide an indication to the user that decoding has been successful. Here, although not illustrated in FIG. 1, the indication of successful decoding may be provided via an audible beep or noise or via illumination of an LED or the like, or both.

Figure 3:
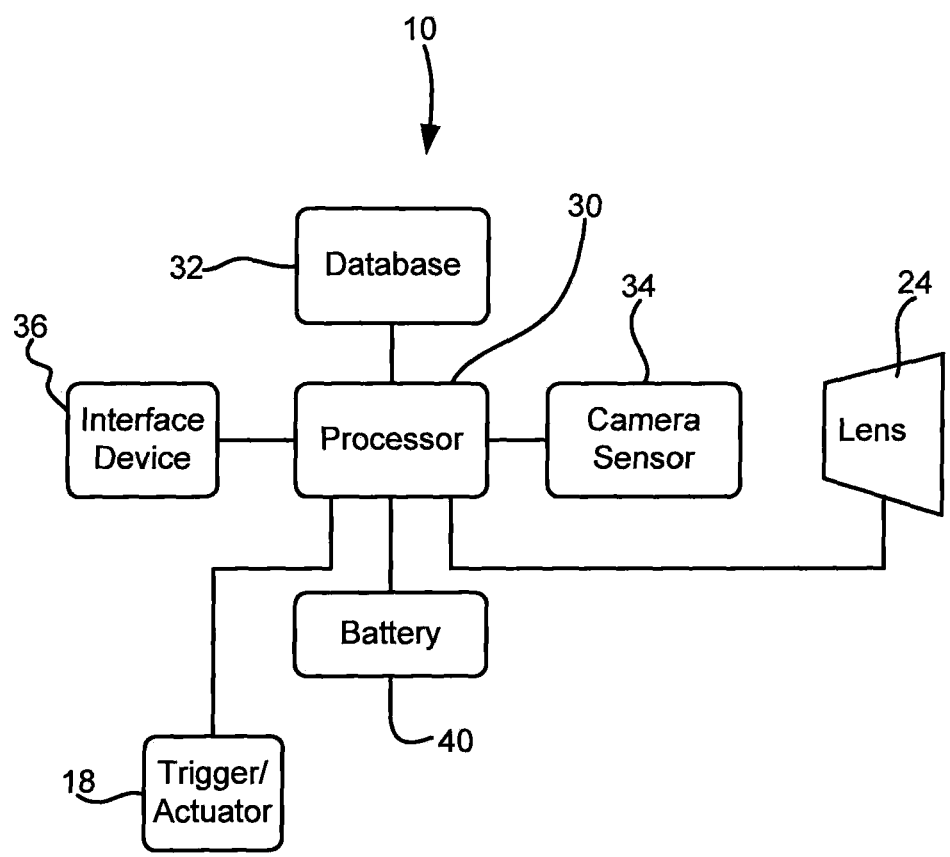
FIG. 3 is a schematic illustrating components that comprise the hand-held reader device of FIGS. 1 and 2.

Referring now to FIG. 3, in addition to the components described above with respect to FIG. 1, reader 10 includes a processor 30, a camera/sensor 34, a battery 40, a database or memory 32, and one or more interface devices 36 such as an audible sound generator, an LED for indicating successful symbol decoding, etc. Processor 30 is linked to database 32 where programs performed by processor 30 are stored. In addition, processor 30 can store images obtained via camera sensor 34 in database 32. Processor 30 is also linked to camera sensor 34 for receiving image data therefrom and is linked to batter 40 for receiving power. Trigger/actuator 18 is linked to processor 30 for initiating a symbol reading process. Processor 30 is also linked to variable focus lens 24 for modifying the focus position or focal length of the lens 24.

Liquid lenses, such as liquid lens 24, are typically constructed of one or more fluid of different refractive indexes, and can be varied by controlling the meniscus, or surface of the liquid. The lenses can be adjusted mechanically, or by the application of a voltage. In one type of liquid lens, for example, two fluids are contained in a tube with transparent end caps. The first is an electrically conducting aqueous solution, and the second is a non-conducting oil. The interior of the tube is coated with a hydrophobic material, which causes the aqueous solution to form a hemispherical lens which can be adjusted by applying a DC voltage across the coating to decrease its water repellency in a process called electrowetting. Electrowetting adjusts the surface tension of the liquid changing the radius of curvature and adjusting the focal length of the lens.

As discussed above, the optical properties of liquid lenses differ from those of typical lenses. The optical power of a liquid lens, for example, decreases as the temperature increases, and as the lens ages. When focusing the lens, moreover, there is hysteresis between the driving voltage and the optical power. That is, as the driving voltage is increased and decreased, the incremental charge in optical power varies, which can detrimentally affect feedback loops.

In one embodiment of the invention, a closed loop control system is used to control the focus of the liquid lens 24. Here, in-focus information is extracted from the image and is used to control the optical power to auto-focus the lens 24. Temperature and aging effects are part of the feedback loop, and are compensated for automatically. To minimize the affects of hysteresis, the driving voltage can be removed between the acquisition of consecutive images, and adjustments made in the direction of increasing voltage. When adjustments are made in this way, the effects of hysteresis are counteracted, and adjustments can be made with relative accuracy.

In other applications, particularly high speed applications, there is insufficient time to capture a sufficient number of images of an object to optimize the focus of the liquid lens 24. Here, other methods can be used to correct for temperature and aging effects on the optical power of the lens, as described below.

Figure 4:
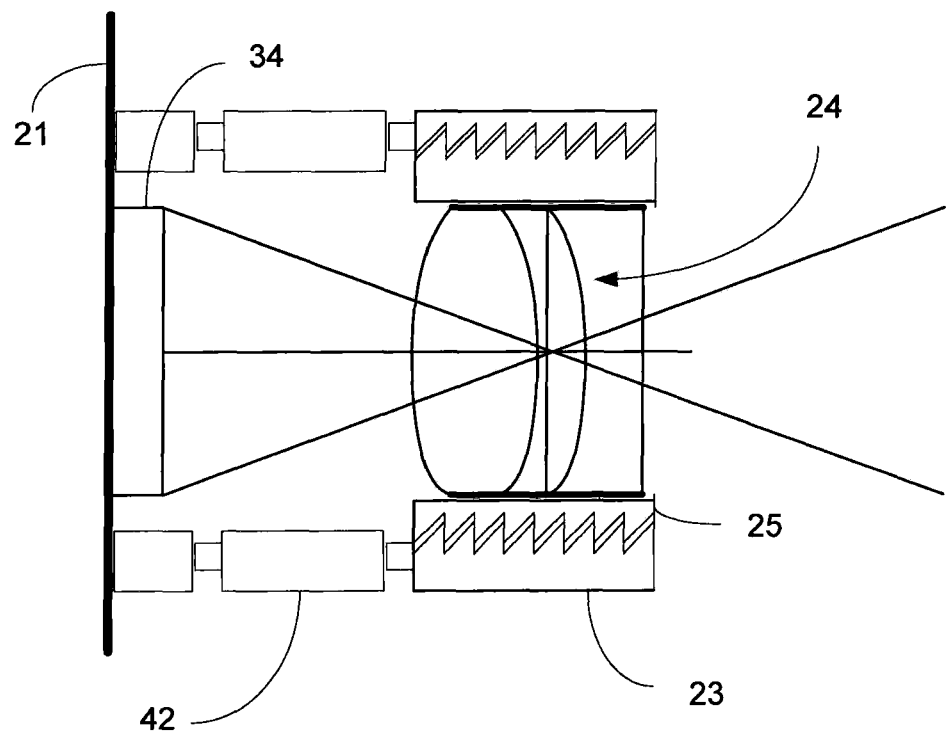
FIG. 4 is a schematic illustrating a lens holder for adjusting a focal length of the lens in the reader of FIG. 1.

Referring now to FIG. 4, a first embodiment of a system that can be used to adjust the liquid lens 24 to alleviate the effects of temperature is shown. Here, by way of example, the liquid lens 24 is used in front of an imager lens 27, and both the liquid lens 24 and imager lens 27 are retained in a lens barrel 25. The lens barrel 25 is received in a lens holder 23, which can be, for example, a barrel-shaped device of the type shown in U.S. Pat. Nos. 5,493,452 and 5,751,501. The lens holder 23 is coupled to a printed circuit board 21 to which sensor 34 is mounted, through a thermal expansion piece 42. Temperature compensation of the lens 24 is provided through thermal expansion of the thermal expansion piece 42. As the optical power of the liquid lens decreases at higher temperatures, the increasing temperature causes the thermal expansion piece 42 to expand, increasing the distance between lens 24 and sensor 34 and therefore increasing the focal distance of the imager 10. The change in focal distance compensates for the effect of temperature on the lens. To provide the appropriate expansion, at least a portion of the lens holder is constructed of a material that has a temperature of coefficient that provides an adjustment corresponding to the adjustment required in the focal length of the lens 24.

Figure 5:
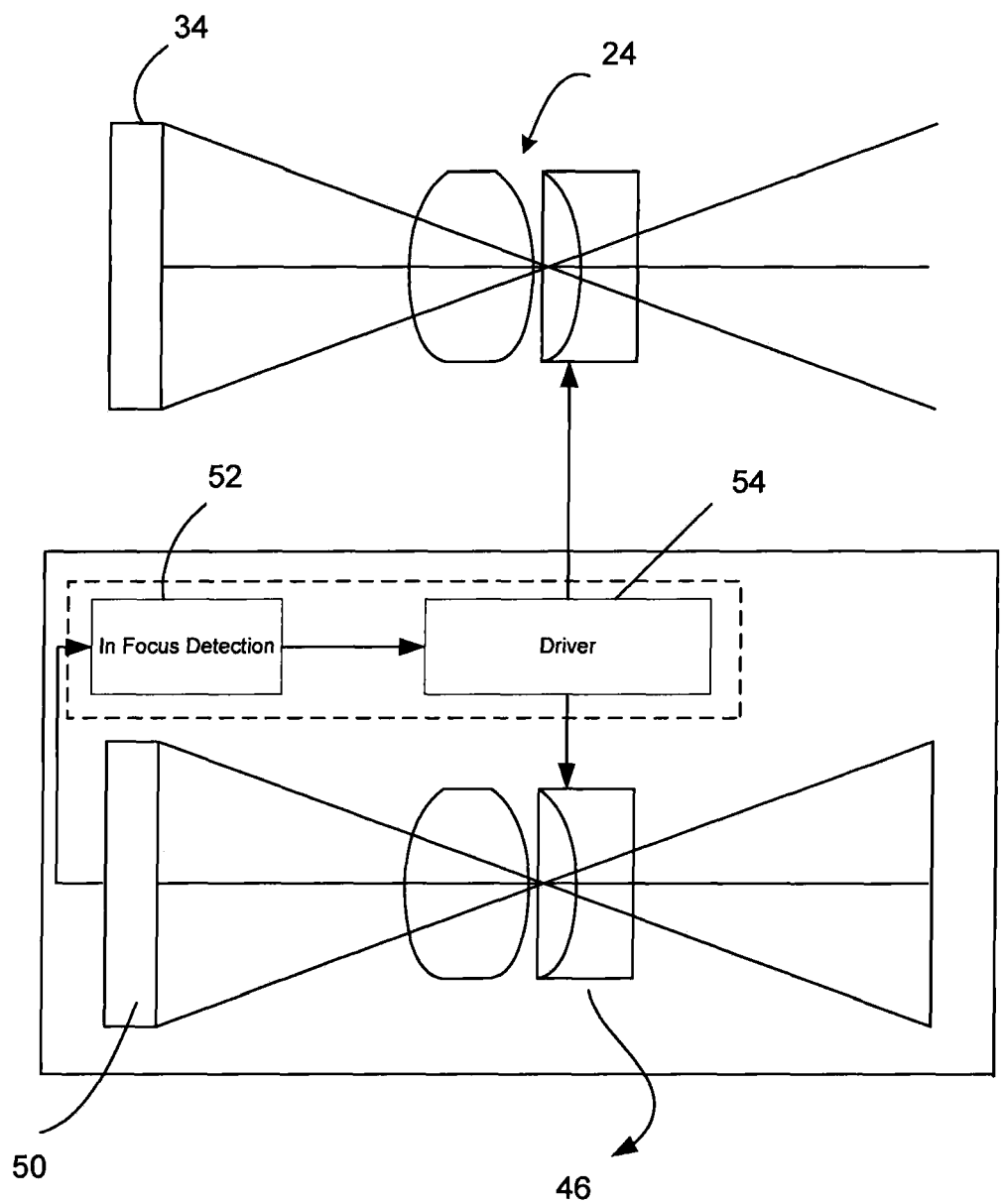
FIG. 5 is a schematic illustrating a circuit for recalibrating the focus of the lens of the reader of FIG. 1.

Referring now to FIG. 5, a second method for adjusting the focus of the liquid lens 24 is shown. Here, a second liquid lens 46 selected to have substantially the same thermal and aging behavior as the liquid lens 24 is incorporated into the reader 10. The second liquid lens 46 is directed at a target 48 at a known distance from the liquid lens 46, and the target 48 is imaged by an image sensor 50. A processor 51 or control circuit is provided, including a focus detector 52 and a driver 54 for adjusting the optical power of the lens. The processor 51 extracts focus information from the image on sensor 50, and drives the driver 54 to adjust the optical power of the liquid lens 46 until the liquid lens 46 is in focus, providing a closed-loop control to calibrate the device.

One method for extracting the focus information, for example, comprises a "hunting" system in which a series of images (i.e., image iterations) are obtained. Here, the focus detector 52 comprises a focus determining process performed between consecutively obtained images. When the focus detector 52 indicates that the lens is not in focus, the driver 54 adjusts the focus to the lens, and a subsequent image is acquired. The processor 51 continues this process the focus detector 52 indicates that the lens position is focused on the target. Temperature and aging effects are therefore compensated for in the closed-loop feedback of the second lens 46, and when the lens 46 is in focus, the processor 51 provides a signal to drive the first lens 24 into focus. The adjustments can be made, for example, by directly adjusting a voltage applied to the liquid lens 24 from the driver 54, as described above, or by providing a signal to a second processor, such as the processor 30 (FIG. 3) discussed above, which then adjusts the focus of the lens 24. Although the re-calibration process could be run continually, the processor 51 could be triggered by errors detected during operation of the reader 10, on power-up before image acquisition begins or though input from a user requesting recalibration. User input could be provided, for example, by a repeated activation of the trigger 18 within a defined time period, by activation of a special key or other input device provided on the reader 10, or in other ways that will be apparent to those of skill in this area. As described above, to limit the effects of hysteresis, the driving voltage can be removed between the acquisition of consecutive images, and adjustments can be made in the direction of increasing voltage only.

In an alternate embodiment of the invention, calibration targets can be used to calibrate the reader 10 to account for changes in temperature and the age of the liquids. Here, an internal or external calibration target can be used to adjust the focus of the lens. The calibration target can be imaged before the reader 10 is activated to read symbols, and the calibration process therefore does not interfere with reader operation during use.

Figure 6:
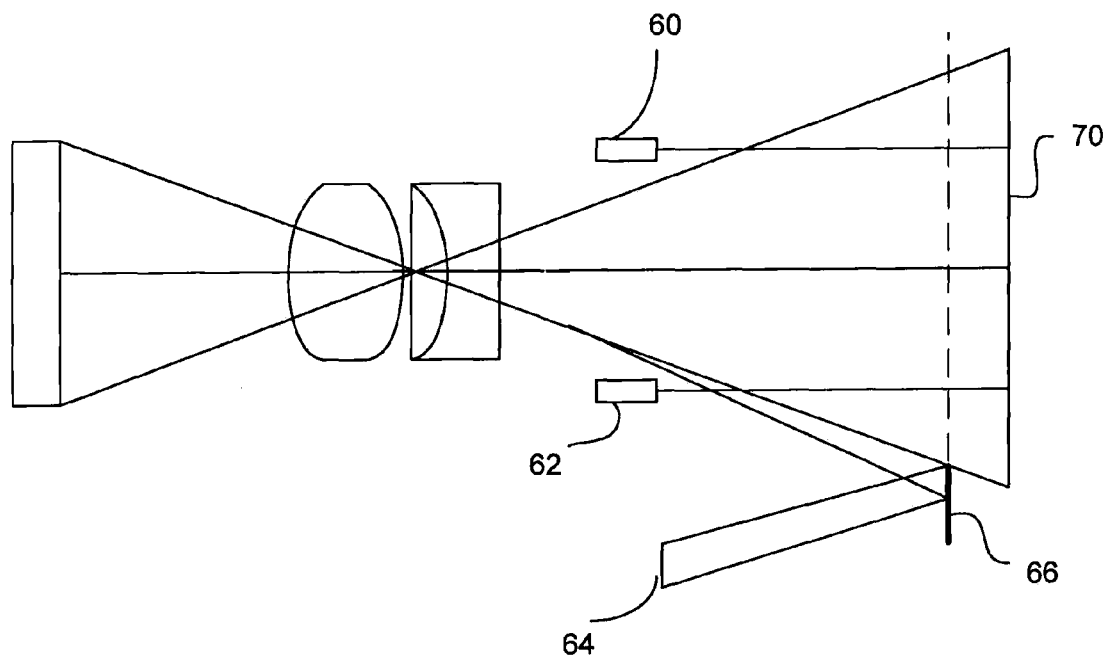
FIG. 6 is a schematic illustrating recalibration of the reader using an internal and an external calibration target.

Referring now to FIG. 6, an internal calibration target 64 in the reader 10 can be used to periodically recalibrate the focal distance of the lens 24. For example, the calibration target 64 is provided at a predetermined distance inside the reader 10 within a small part of the field of view 26. A reflector such as a mirror 66 reflects images of the calibration target 64 through the lens 24 and onto the sensor 34. The mirror 66 can be, for example, provided on the window 25 (see also FIG. 2) of the reader 10. The focal distance of the lens 24 can be recalibrated based on comparative data to a known, focused image acquired of the calibration target 64 stored in memory. Alternatively, the lens 24 can be focused using a "hunting" method as described above, or by using other methods of auto-focusing known in the art. Again, calibration could be started automatically on power-up, after the trigger 18 is pulled, or when errors are detected by the reader 10, or when requested by a user activating a specialized key or sequence of keys.

Referring still to FIG. 6, an external calibration target 70 can also be provided, either in addition to or as an alternative to the internal calibration target 64 described above. Here, one or more illumination device, such as aiming beams 60 and 62 typically present in the reader 10 to provide feedback to an operator for aiming, are used to measure the distance to the calibration target 70. After the distance is determined, the focus can be adjusted for the known distance based on data stored in memory. If, after the adjustment is made, the image is not in focus, further adjustments can be made to the stored settings. Further adjustments can be made using a "hunting" method as described above, or other methods of applying feedback to adjust the focus.

If the image or a size of the image is known, the distance between the aiming beams 60 and 62, and the ratio of the calculated distance between the aiming beams to the image size can be calculated and used to determine a distance to the calibration target 70. The internal and external targets 64 and 70 can be used separately, as described above, or together to provide an improved focal adjustment to the lens 24.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. For example, although a hand-held system is shown and described above, the reader 10 can be a fixed mount system. In a fixed mount system, the distance from the reader 10 to a symbol or character to be read will be known, and under these circumstances, adjustment of the focus can, in some applications, be simplified.

To apprise the public of the scope of this invention, the following claims are made:

What is claimed is:

1. A system for performing a vision process using a camera, the system comprising:
   a liquid lens having an imaging lens field of view where the focus of the liquid lens is adjustable;
   an imaging sensor for imaging the field of view;
   at least one calibration target positioned at a predetermined location within the field of view;
   a processor receiving imaging data from the imaging sensor, the processor being programmed to:
   capture an image at a number of different focus positions of the liquid lens;
   calculate a value that compares that part of the image where the calibration target is located to a known, focused image acquired of the calibration target stored in memory; and
   use the comparison to determine temperature and aging effects of the liquid lens.

2. The system as recited in claim 1, wherein the liquid lens, the imaging sensor, and the processor are located in a housing.

3. The system as recited in claim 2, wherein the calibration target is positioned within a field of view at the distal end of the housing.

4. The system as recited in claim 3, wherein a window is provided at the distal end of the housing, and wherein the calibration target is positioned on the window.

5. The system as recited in claim 1, further comprising at least one aiming illuminator for providing feedback to an operator as to the position of the field of view, and wherein the processor is further programmed to determine a distance to the calibration target based on feedback from the aiming illuminator, and to evaluate a focus of the liquid lens based on the focus of the calibration target.

6. The system as recited in claim 5, further comprising a second aiming illuminator, and wherein the processor is further programmed to:
   calculate a distance between the aiming illuminator and the second aiming illuminator;
   focus the lens to obtain a sharp image of the calibration target and determine a size of the calibration target;
   calculate a ratio of the distance to the size of the calibration target; and
   use the ratio to determine a distance to the calibration target.

7. The system as recited in claim 1, further comprising a mirror reflecting an image of the calibration target on the imaging sensor.

8. The system as recited in claim 1, wherein the processor is programmed to image the calibration target when the system is powered up.

9. The system as recited in claim 1, wherein the processor is programmed to image the calibration target when a trigger is pulled.

10. The system as recited in claim 6, wherein the processor is further programmed to store the distance to the calibration target in a memory.

11. A system for performing a vision process using a camera, the system comprising:
    a liquid lens having an imaging lens field of view where the focus of the liquid lens is adjustable;
    an imaging sensor for imaging the field of view;
    a calibration target;
    a first aiming illuminator;
    a second aiming illuminator;
    a processor receiving imaging data from the imaging sensor, the processor being programmed to:
    calculate a distance between the aiming illuminator and the second aiming illuminator;
    focus the liquid lens to obtain a sharp image of the calibration target;
    calculate a ratio of the distance to a size of the calibration target; and
    use the ratio to determine a distance to the calibration target, wherein the calculated distance is usable to focus the liquid lens.

12. The system as recited in claim 11, wherein the processor is further programmed to store the distance to the calibration target in a memory.

13. The system as recited in claim 11, wherein the processor is programmed to image the calibration target when the system is powered up.

14. The system as recited in claim 11, wherein the processor is programmed to image the calibration target when a trigger is pulled.

15. The system as recited in claim 11, wherein the liquid lens, the imaging sensor, and the processor are located in a housing.

16. The system as recited in claim 11, further comprising a second calibration target, and wherein the second calibration target is positioned within a field of view at the distal end of the housing.

17. The system as recited in claim 15, wherein a window is provided at the distal end of the housing, and wherein the second calibration target is positioned on the window.

18. The system as recited in claim 17, wherein the processor is further programmed to store a known focused image of the second calibration target in a memory.

19. The system as recited in claim 18, wherein the processor is further programmed to:
- capture an image at a number of different focus positions of the liquid lens;
- calculate a value that compares that part of the image where the second calibration target is located to the known, focused image in the memory; and
- use the comparison to determine temperature and aging effects of the liquid lens.

20. The system as recited in claim 15, wherein the calibration target is external to the housing.

\* \* \* \* \*